US008405991B2

(12) United States Patent
Roy Trudel et al.

(10) Patent No.: US 8,405,991 B2

(45) Date of Patent: Mar. 26, 2013

(54) HEAT TRANSFER ELEMENT TEMPERATURE VARIATION SYSTEM

(75) Inventors: Anik Roy Trudel, Montreal (CA); Mariana Barbulescu, Dollard-des-Ormeaux (CA); Yong Ng Tong, Dollard-des-Ormeaux (CA)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/112,424

(22) Filed: May 20, 2011

(65) Prior Publication Data

US 2012/0293959 A1 Nov. 22, 2012

(51) Int. Cl.
*H05K 7/20* (2006.01)

(52) U.S. Cl. ........................ 361/699; 73/25.01; 361/677

(58) Field of Classification Search ........................ None
See application file for complete search history.

(56) References Cited

U.S. PATENT DOCUMENTS

| | | | | |
|---|---|---|---|---|
| 4,271,474 | A | 6/1981 | Belanger et al. | |
| 5,271,263 | A * | 12/1993 | Gibeault | 73/19.12 |
| 5,773,709 | A | 6/1998 | Gibeault et al. | |
| 6,401,518 | B1 * | 6/2002 | O'Keeffe et al. | 73/19.01 |
| 6,446,027 | B1 | 9/2002 | O'Keeffe et al. | |
| 6,494,617 | B1 * | 12/2002 | Stokes et al. | 374/152 |
| 6,656,335 | B2 | 12/2003 | Babes-Dornea et al. | |
| 7,582,196 | B2 | 9/2009 | Babes-Dornea et al. | |
| 2006/0250683 | A1 | 11/2006 | Balan | |
| 2007/0240438 | A1 | 10/2007 | King | |
| 2010/0040935 | A1 | 2/2010 | Babes-Dornea et al. | |

FOREIGN PATENT DOCUMENTS

EP 1 470 948 A1 10/2004

OTHER PUBLICATIONS

Search Report issued in connection with EP Applicatiot No. 12168506.9, Oct. 9. 2012.

Search Report and Written Opinion from corresponding EP Application No. 12168507.7-1232 dated Oct. 4, 2012.

GE Energy, "HYDRAN 201i System Technical Specifications", pp. 1-16, Jun. 1, 2004.

GE Energy, "Kelman Transfix* on-line DGA (Dissolved Gas Analysis) unit and moisture for transformers", pp. 1-2, Feb. 28, 2009.

GE Energy, "GE Digital Energy. Kelman TRANSFIX* on-line DGA (Dissolved Gas Analysis) unit and moisture for transformers", pp. 1-2, Aug. 31, 2010.

BPL Global, "Serveron TM TM3 On-line Transformer Monitor", pp. 1-6, Dec. 31, 2010.

General Electric, "GE Energy Expands Asset Monitoring Portfolio, Launches Cost-Effective Warning Solution for Less Critical Transformers", pp. 1-2, Mar. 29, 2011.

(Continued)

*Primary Examiner* — Gregory Thompson

(74) *Attorney, Agent, or Firm* — Hoffman Warnick LLC; William Heinze

(57) ABSTRACT

A heat transfer element temperature variation system is disclosed. In one embodiment, the system includes: a heat transfer element configured to thermally couple to an insulating fluid within an electrical device; an ambient temperature sensor; and a control system coupled to the heat transfer element and the ambient temperature sensor, the control system for instructing the heat transfer element to adjust a temperature of the insulating fluid within the electrical device based upon a temperature indicator from the ambient temperature sensor.

17 Claims, 3 Drawing Sheets

Ambient Sensor 4
Control System 6
Power Supply 11
8
26
Electrical Device 20
24
28
22

OTHER PUBLICATIONS

GE Energy. "IntellixTM GLA 100. Cost Effective Transformer Warning Solution", pp. 1-2, Mar. 29, 2011.
General Electric, "GE Energy Expands Asset Monitoring Portfolio, Launches Cost-Effective, Warning Solution for Less Critical Transformers", pp. 1, Mar. 29. 2011,
GE Energy, "GE Energy Expands Asset Monitoring Portfolio, Launches Cost-Effective Warning Solution for Less Critical Transformers", pp. 1-4, Mar. 30, 2011.
Anonymous, "Warning Solution for Less Critical Transformers", pp. 1-4, May 1, 2011.

* cited by examiner

HEAT TRANSFER ELEMENT TEMPERATURE VARIATION SYSTEM

CROSS-REFERENCE TO RELATED APPLICATION

This application is related to concurrently filed U.S. patent application Ser. No. 13/112,469, filed on May 20, 2012, entitled "FAULT GAS ALARM SYSTEM."

BACKGROUND OF THE INVENTION

The subject matter disclosed herein relates to a temperature variation system for a heat transfer element. Specifically, the subject matter disclosed herein relates to a system for adjusting the temperature of a heat transfer element fluidly connected to a temperature-modifying fluid (e.g., an oil) in an electrical system.

Some conventional electrical systems or devices (e.g., transformers, circuit breakers, etc.) use a dielectric fluid (e.g., oil) as an insulating substance. In the case of a disturbance or malfunction in one of these systems or devices, one or more gases can be produced in the insulating fluid. This can happen in the case that a device is working at too high a temperature, or if an electrical discharge is occurring in the device.

Some of these conventional electrical systems and devices induce circulation of this insulating fluid via a temperature gradient. These systems and devices induce fluid flow between an area within the device and a fluid pocket connected thereto by modulating (or, adjusting) the temperature in the fluid pocket, thereby establishing a temperature gradient between the fluid in the pocket and the fluid in the device. However, these conventional electrical systems and devices do not effectively adjust the temperature of the fluid.

BRIEF DESCRIPTION OF THE INVENTION

A heat transfer element temperature variation system is disclosed. In one embodiment, the system includes: a heat transfer element configured to thermally couple to an insulating fluid within an electrical device; an ambient temperature sensor; and a control system coupled to the heat transfer element and the ambient temperature sensor, the control system for instructing the heat transfer element to adjust a temperature of the insulating fluid within the electrical device based upon a temperature indicator from the ambient temperature sensor.

A first aspect of the invention includes a heat transfer element temperature variation system having: a heat transfer element configured to thermally couple to an insulating fluid within an electrical device; an ambient temperature sensor; and a control system coupled to the heat transfer element and the ambient temperature sensor, the control system for instructing the heat transfer element to adjust a temperature of the insulating fluid within the electrical device based upon a temperature indicator from the ambient temperature sensor.

A second aspect of the invention includes an electrical device having: a housing including an insulating fluid; an ambient temperature sensor configured to obtain an indicator of a temperature external to the housing; a heat transfer element configured to thermally couple to an insulating fluid within an electrical device; and a control system coupled to the heat transfer element and the ambient temperature sensor, the control system for instructing the heat transfer element to adjust a temperature of the insulating fluid within the electrical device based upon the indicator from the ambient temperature sensor.

A third aspect of the invention includes a heat transfer element temperature variation system having: at least one computing device configured to perform the processes including: obtaining an ambient temperature indicator about a location external to an electrical device; comparing the ambient temperature indicator to a set of established temperature settings; determining whether at least one temperature setting in the set of established temperature settings requires modification; and providing instructions for modifying a temperature of a heat transfer element thermally connected to the electrical device in response to the at least one temperature setting in the set of established temperature settings requiring modification.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

Figure 1:
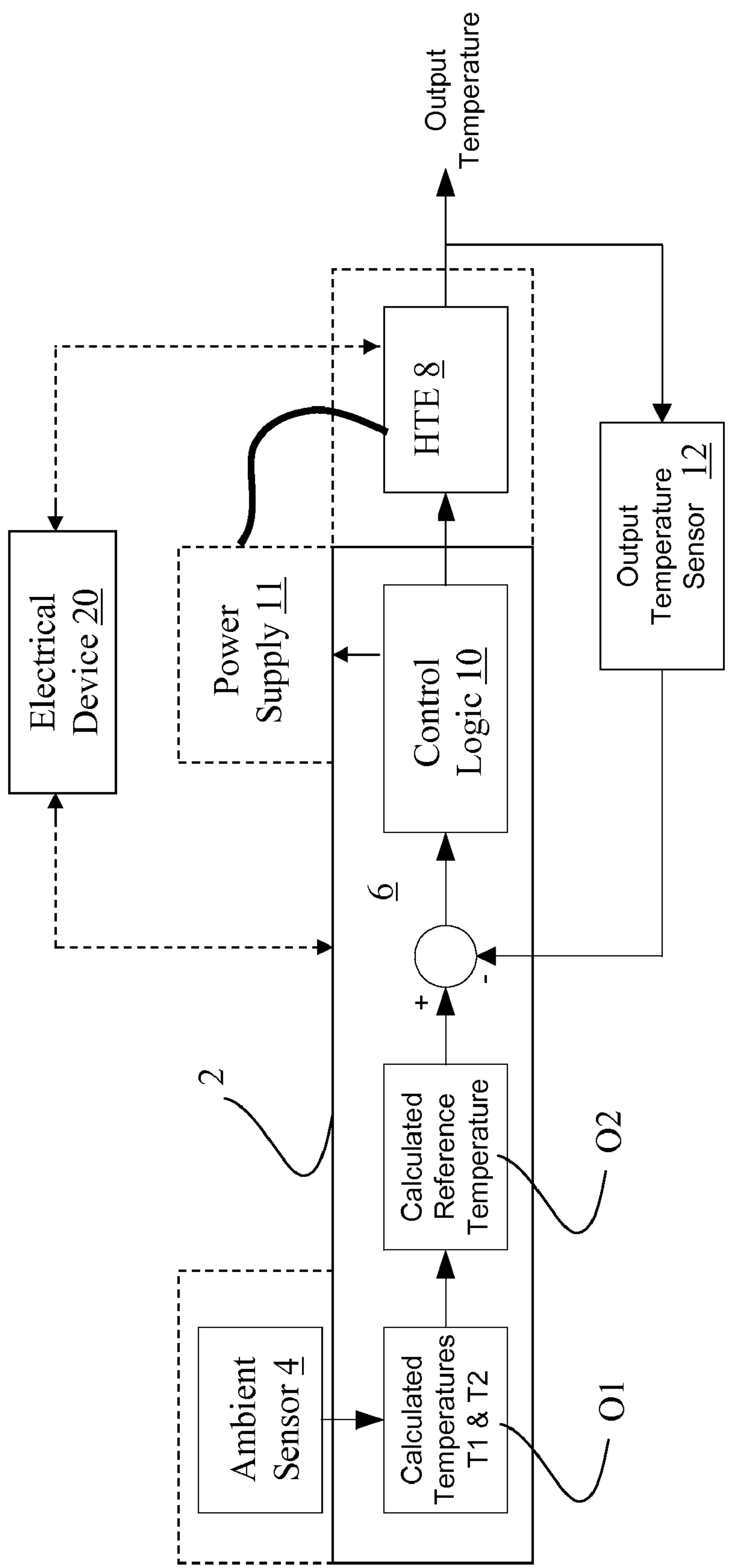
FIG. 1 shows a schematic diagram of a heat transfer element temperature variation system according to embodiments of the invention.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Aspects of the invention relate to a temperature variation system for a heat transfer element. Specifically, the subject matter disclosed herein relates to a system for varying (or, adjusting) the temperature of a heat transfer element fluidly connected to a temperature-modifying fluid in an electrical system.

As noted herein, some conventional electrical systems or devices (e.g., transformers, circuit breakers, etc.) use a dielectric fluid (e.g., oil) as an insulating substance. In the case of a disturbance or malfunction in one of these systems or devices, one or more gases can be produced in the insulating fluid. This can happen in the case that a device is working at too high a temperature, or if an electrical discharge is occurring in the device.

Some of these conventional electrical systems and devices induce circulation of this insulating fluid through thermal induction. These systems and devices induce fluid flow between an area within the device and a fluid pocket connected thereto by modulating (or, adjusting) the temperature in the fluid pocket, thereby establishing a temperature gradient between the fluid in the pocket and the fluid in the device. However, these conventional electrical systems and devices do not effectively adjust the temperature of the fluid. Conventional systems adjust (or, modulate) a temperature of a heat transfer element in thermal communication with fluid in the fluid pocket between two pre-determined temperature parameters, T1 and T2, respectively. Because the electrical device may be exposed to extreme ambient temperatures (e.g., −70 degrees Celsius), the heating element must be sufficiently large to adjust the fluid pocket temperature between the pre-set temperatures. The size of the heating element may cause the device to be oversized when compared to its desired design size, and may further make sizing of systems including the device difficult. Additionally, as these devices reduce in size from generation to generation, the amount of power available to move the insulating fluid is reduced. Conventional approaches fail to effectively accommodate this reduced power supply in their designs.

In contrast to these conventional devices, aspects of the invention include a system having an ambient temperature gauge (e.g., a temperature sensor) paired with a control system to dynamically adjust the reference temperatures used to calculate the reference temperature for the heat transfer element (and thus, the insulating fluid). This system allows for a smaller heating element (and similarly, reduced heating power) when compared with the conventional devices.

As described herein, aspects of the invention include a heat transfer element temperature variation system having an ambient temperature sensor, a control system coupled to the ambient temperature sensor, and a heat transfer element coupled to the control system, where the heat transfer element is configured to adjust a temperature of an insulating fluid within an electrical device.

A second aspect of the invention includes an electrical device having a housing including an insulating fluid, an ambient temperature sensor configured to obtain an indicator of a temperature external to the housing, a control system coupled to the ambient temperature sensor, and a heat transfer element coupled to the control system and the insulating fluid, the heat transfer element configured to adjust the temperature of the insulating fluid based upon the indicator from the ambient temperature sensor.

A third aspect of the invention includes a heat transfer element temperature variation system having at least one computing device configured to: obtain an ambient temperature indicator about a location external to an electrical device, compare the ambient temperature indicator to a set of established temperature settings, determine whether at least one temperature setting in the set of established temperature settings requires modification, and provide instructions for modifying a temperature of a heat transfer element thermally connected to the electrical device in response to the at least one temperature setting in the set of established temperature settings requiring modification.

Turning to FIG. 1, a schematic diagram of a heat transfer element temperature variation system 2 is shown according to embodiments of the invention. As shown, the heat transfer element temperature variation system (or, variation system) 2 may include an ambient temperature sensor 4 (shown in phantom as included in some embodiments), a control system 6 coupled to the ambient temperature sensor 4, and a heat transfer element (or, HTE) 8 coupled to the control system 6. As is described further herein, the heat transfer element 8 may be configured to adjust a temperature of an insulating fluid within an electrical device 20 (e.g., a transformer, a circuit breaker, etc.)

Also illustrated in FIG. 1, the control system 6 can include control logic 10 configured to determine an amount of variation (or, modulation) of the temperature of an insulating fluid within the electrical device. In some embodiments, the control system 6 (including the control logic 10) determines the amount of variation of the temperature of the insulating fluid based upon a temperature measurement obtained from the ambient temperature sensor 4. Adjusting the temperature of the insulating fluid may be performed via adjusting the temperature of the HTE 8, which is fluidly connected to the insulating fluid. As shown in FIG. 1, the ambient sensor 4 may provide a temperature indicator (e.g., a reading or measurement) about an environment (e.g., surrounding air) external to an electrical device. The control system 6 may obtain that temperature indicator and dynamically calculate temperature parameters (e.g., boundaries) in response to obtaining that indicator. In one embodiment, these boundaries may be high and low temperature parameters, e.g., T1 (low) and T2 (high), denoted as data object O1. Using these temperature parameters (O1), the control system 6 may then calculate a reference temperature (data object O2) used as a target temperature for the HTE 8. As noted herein, the reference temperature (data object O2) in some cases is not user configurable, and is calculated as a function of the temperature indicator from the ambient sensor 4 and the high and low temperature parameters (e.g., object O1). In some case, the reference temperature (data object O2) can be set at a target of approximately 10-15 degrees Celsius from the measured ambient temperature from the ambient sensor 4. Additionally, in some case, the reference temperature can include a range of approximately 10 degrees Celsius.

The control system 6 (e.g., via the control logic 10) may determine the amount of power required to modify the temperature of the HTE 8, and send instructions to modify a power supply 11 accordingly. The power supply 11 can be any conventional power supply component, and may be located within the control system 6 or external to the control system 6. It is additionally understood that the monitoring of the temperature at the ambient sensor 4, and the adjusting of the power supply 11 may be performed continuously, or in intervals (e.g., with a frequency of once per hour).

As described further herein, the HTE 8 may be connected with a fluid pocket (fluid pocket 28, FIG. 2) that is fluidly connected to an insulating fluid in the electrical device. Modifying the temperature of the HTE 8 will also alter the temperature of the fluid pocket, and thereby induce flow of the insulting fluid through the electrical device via a temperature gradient. FIG. 1 also illustrates an output temperature sensor 12 for providing feedback as to the temperature of the HTE 8 (e.g., via an output temperature reading of the HTE 8). The output temperature sensor 12 provides feedback on the measured output temperature of the HTE 8, which may then be further modified according to the control logic 10 in the case that the output temperature of the HTE 8 deviates from the calculated reference temperature (object O2).

Figure 2:
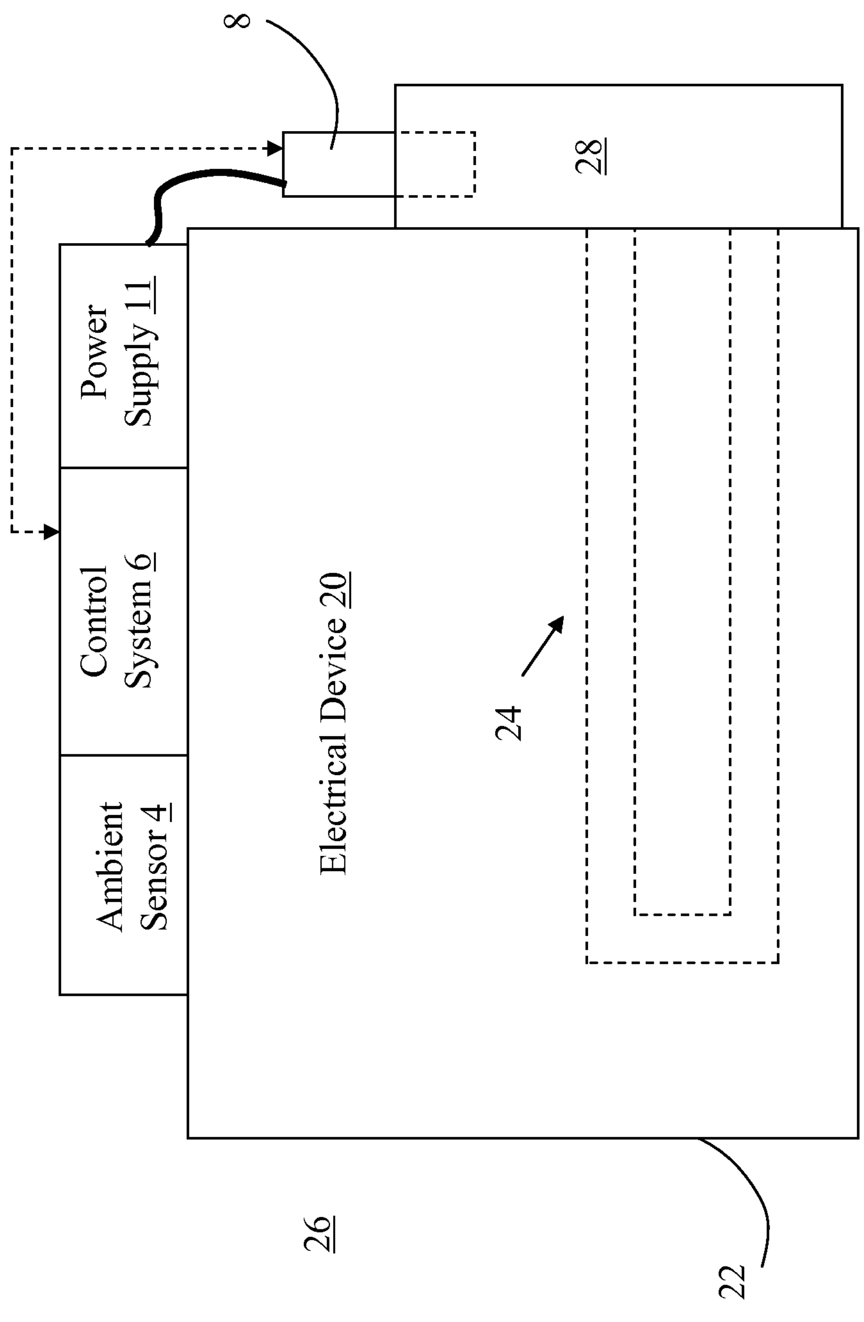
FIG. 2 shows a schematic diagram of an electrical device according to embodiments of the invention.

Turning to FIG. 2, a schematic illustration of an electrical device 20 is shown according to embodiments of the invention. In one embodiment the electrical device 20 can include a housing 22 including an insulating fluid (e.g., an oil), where the fluid is depicted within a conduit 24. It is understood that while the housing 22 is depicted as including the conduit 24, the housing may take any shape capable of containing the insulating fluid and insulating one or more components within the electrical device 20. In some embodiments, the electrical device 20 can include one or more of a conventional transformer or circuit breaker.

As shown, the electrical device 20 can further include an ambient temperature sensor (e.g., ambient sensor 4, described with reference to FIG. 1), which can be affixed and/or located at least partially externally to the housing 22. That is, the ambient sensor 4 can include at least a portion extending beyond the housing 22 of the electrical device 20 to contact the ambient air 26. This ambient sensor 4 may continuously monitor the temperature of the ambient air 26, and provide continuous feedback to the control system 6. As described with reference to FIG. 1, the control system 6 may obtain the temperature indicators (e.g., readings or measurements) from the ambient sensor 4 (e.g., via hard-wired and/or wireless coupling) and generate instructions to modify a power supply 11 to the HTE 8. The HTE 8 may be coupled to the control system 6 via hard-wired and/or wireless coupling, and the HTE 8 may be configured to adjust a temperature of the insulating fluid within the housing 22 via modification of a temperature of a fluid within the fluid pocket 28. It is understood that coupling between components described herein can be by way of wireless and/or hard-wired means, and in some cases, components depicted substantially aside one another may be located remotely with respect to each other. For example, ambient sensor 4, control system 6, HTE 8, power supply 11 and/or electrical device 20 may be connected physically, or in some cases, via remote means. In some cases, even where these As the fluid in the fluid pocket 28 is heated or cooled (by modifying the power supplied to the HTE 8), flow of the fluid through the conduit 24 is induced, and that fluid circulates back through the pocket 28. This re-circulated fluid may then be heated (in the case of heating) via the HTE 8, further facilitating fluid flow and heat transfer in the electrical device 20.

In contrast to conventional approaches, aspects of the invention allow for a smaller power supply (e.g., power supply 11) that is able to respond in real-time to ambient temperature changes via the control system 6. Where the calculated reference temperature (object O2, FIG. 1) is variable, as in the variation system 2 described herein, the power supply 11 may be able to incrementally respond to variations in temperature, thereby requiring less power output at a given moment. For example, in the case that the ambient temperature (e.g., ambient air 26, FIG. 2) cooled to approximately less than −70 degrees Celsius, the control system 6 (coupled with the ambient sensor 4) may continuously monitor the drop in temperature and incrementally increase the power supplied to the HTE 8. In contrast, the conventional approaches (using a fixed reference temperature) would have to dramatically increase power supplied to an HTE after determining that the insulating fluid has cooled and is not circulating as desired. This requires a significantly larger power supply when compared to the power supply 11 utilized in aspects of the invention. For example, in some embodiments of the invention, the power supply may be reduced by approximately 33 percent when compared with conventional approaches (e.g., reducing the maximum power required from approximately 300 Watts to approximately 200 Watts).

As will be appreciated by one skilled in the art, the variation system described herein may be embodied as a system(s), method(s) or computer program product(s), e.g., as part of an variation system. Accordingly, embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Magik, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present invention are described herein with reference to data flow illustrations and/or block diagrams of methods, apparatus (systems) and computer program products according to embodiments of the invention. It will be understood that each block of the data flow illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 3:
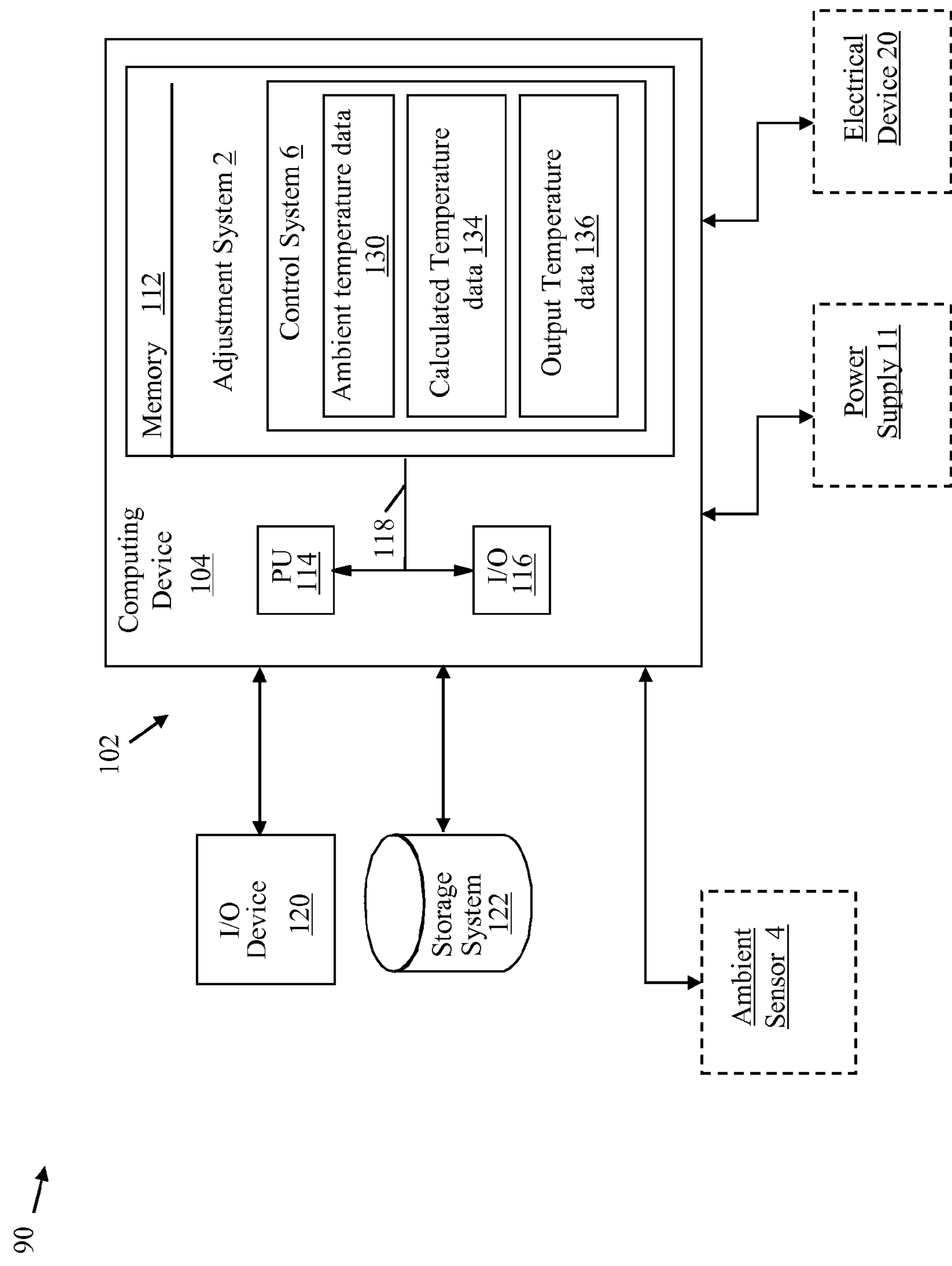
FIG. 3 shows an environment including a heat transfer element temperature variation system according to embodiments of the invention.

Turning to FIG. 3 an illustrative environment 90 including an variation system 2 is shown according to embodiments of the invention. Environment 90 includes a computer infrastructure 102 that can perform the various processes described herein. In particular, computer infrastructure 102 is shown including a computing device 104 that comprises the variation system 2, which enables computing device 104 to adjust a temperature of an insulating fluid in an electrical device (e.g., electrical device 20) by performing the process steps of the disclosure.

Computing device 104 is shown including a memory 112, a processor (PU) 114, an input/output (I/O) interface 116, and a bus 118. Further, computing device 104 is shown in communication with an external I/O device/resource 120 and a storage system 122. As is known in the art, in general, processor 114 executes computer program code, such as variation system 2, that is stored in memory 112 and/or storage system 122. While executing computer program code, processor 114 can read and/or write data, such as ambient temperature data 130, calculated temperature data 134 and/or output temperature data 136 to/from memory 112, storage system 122, and/or I/O interface 116. Bus 118 provides a communications link between each of the components in computing device 104. I/O device 120 can comprise any device that enables a user to interact with computing device 104 or any device that enables computing device 104 to communicate with one or more other computing devices. Input/output devices (including but not limited to keyboards, displays, pointing devices, etc.) can be coupled to the system either directly or through intervening I/O controllers.

In some embodiments, as shown in FIG. 3 environment 90 may optionally include an ambient sensor 4, a power supply 11 and/or an electrical device 20 operably connected to the variation system 2 through computing device 104 (e.g., via wireless or hard-wired means). It is understood that variation system 2 may further include conventional transmitters and receivers for transmitting and receiving, respectively, data from the ambient sensor 4, a power supply 11 and/or an electrical device 20.

In any event, computing device 104 can comprise any general purpose computing article of manufacture capable of executing computer program code installed by a user (e.g., a personal computer, server, handheld device, etc.). However, it is understood that computing device 104 and variation system 2 are only representative of various possible equivalent computing devices that may perform the various process steps of the disclosure. To this extent, in other embodiments, computing device 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, computer infrastructure 102 is only illustrative of various types of computer infrastructures for implementing the disclosure. For example, in one embodiment, computer infrastructure 102 comprises two or more computing devices (e.g., a server cluster) that communicate over any type of wired and/or wireless communications link, such as a network, a shared memory, or the like, to perform the various process steps of the disclosure. When the communications link comprises a network, the network can comprise any combination of one or more types of networks (e.g., the Internet, a wide area network, a local area network, a virtual private network, etc.). Network adapters may also be coupled to the system to enable the data processing system to become coupled to other data processing systems or remote printers or storage devices through intervening private or public networks. Modems, cable modem and Ethernet cards are just a few of the currently available types of network adapters. Regardless, communications between the computing devices may utilize any combination of various types of transmission techniques.

As previously mentioned and discussed further below, variation system 2 has the technical effect of enabling computing infrastructure 102 to perform, among other things, the temperature variation functions described herein. It is understood that some of the various components shown in FIG. 3 can be implemented independently, combined, and/or stored in memory for one or more separate computing devices that are included in computer infrastructure 102. Further, it is understood that some of the components and/or functionality may not be implemented, or additional schemas and/or functionality may be included as part of environment 90.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A heat transfer element temperature variation system comprising:

a heat transfer element configured to thermally couple to an insulating fluid within an electrical device;

an ambient temperature sensor; and a control system coupled to the heat transfer element and the ambient temperature sensor, the control system configured to:

obtain a temperature indicator about an environment external to the electrical device from the ambient temperature sensor;

calculate temperature boundaries for the insulating fluid based upon the temperature indicator;

calculate a reference temperature representing a temperature target for a temperature of the heat transfer element, the reference temperature falling within the temperature boundaries and based upon the temperature boundaries and the temperature indicator about the environment external to the electrical device; and modify a temperature of the heat transfer element to adjust a temperature of the insulating fluid based upon the reference temperature.

2. The heat transfer element temperature variation system of claim 1, wherein the electrical device includes a transformer.

3. The heat transfer element temperature variation system of claim 2, wherein the insulating fluid includes oil.

4. The heat transfer element temperature variation system of claim 1, wherein the electrical device is a circuit breaker.

5. The heat transfer element temperature variation system of claim 1, wherein the control system is configured to determine an amount of variation of the temperature of the insulating fluid.

6. The heat transfer element temperature variation system of claim 5, wherein the control system determines the amount of variation of the temperature of the insulating fluid based upon the temperature indicator from the ambient temperature sensor.

7. An electrical device comprising:

a housing including an insulating fluid;

an ambient temperature sensor configured to obtain an indicator of a temperature external to the housing;

a heat transfer element configured to thermally couple to an insulating fluid within an electrical device; and a control system coupled to the heat transfer element and the ambient temperature sensor, the control system configured to:

obtain a temperature indicator about an environment external to the electrical device from the ambient temperature sensor;

calculate temperature boundaries for the insulating fluid based upon the temperature indicator;

calculate a reference temperature representing a temperature target for a temperature of the heat transfer element, the reference temperature falling within the temperature boundaries and based upon the temperature boundaries and the temperature indicator about the environment external to the electrical device; and modify a temperature of the heat transfer element to adjust a temperature of the insulating fluid within the electrical device based upon the reference temperature.

8. The electrical device of claim 7, wherein the electrical device includes a transformer.

9. The electrical device of claim 7, wherein the electrical device is a circuit breaker.

10. The electrical device of claim 7, wherein the ambient temperature sensor is affixed at least partially externally to the housing.

11. The electrical device of claim 7, wherein the control system is configured to determine an amount of variation of the temperature of the insulating fluid.

12. The electrical device of claim 11, wherein the control system determines the amount of variation of the temperature of the insulating fluid based upon the indicator from the ambient temperature sensor.

13. The electrical device of claim 7, further comprising a fluid pocket fluidly connected to the insulating fluid and the heat transfer element, wherein the adjusting of the temperature of the insulating fluid is performed via adjusting a temperature of a fluid in the fluid pocket.

14. A heat transfer element temperature variation system comprising:

at least one computing device configured to perform the processes including:

obtaining an ambient temperature indicator about a location external to an electrical device;

comparing the ambient temperature indicator to a set of established temperature settings for insulating fluid contained within the electrical device;

determining whether at least one temperature setting in the set of established temperature settings requires modification based upon the ambient temperature indicator, the determining including determining an amount of modification of the temperature of the heat transfer element based upon the ambient temperature indicator; and providing instructions for modifying a temperature of a heat transfer element thermally connected to the insulating fluid contained within the electrical device in response to the at least one temperature setting in the set of established temperature settings requiring modification.

15. The heat transfer element temperature variation system of claim 14, wherein the electrical device includes a transformer.

16. The heat transfer element temperature variation system of claim 14, wherein the electrical device includes a circuit breaker.

17. The heat transfer element temperature variation system of claim 14, further comprising:

a fluid pocket fluidly connected with the heat transfer element, wherein the modifying of the temperature of the heat transfer element induces modification of a temperature of a fluid in the fluid pocket.

* * * * *